United States Patent [19]

Besson

[11] Patent Number: 5,761,267
[45] Date of Patent: Jun. 2, 1998

[54] METHODS AND APPARATUS FOR SIMPLIFIED FILTERING OF SCAN DATA IN AN IMAGING SYSTEM

[75] Inventor: Guy M. Besson, Wauwatosa, Wis.

[73] Assignee: General Electric Company, Milwaukee, Wis.

[21] Appl. No.: 773,082

[22] Filed: Dec. 26, 1996

[51] Int. Cl.[6] .................................................. A61B 6/03
[52] U.S. Cl. ....................................... 378/4; 378/901
[58] Field of Search .............................. 378/4, 15, 19, 378/901; 256/363.04

[56] References Cited

U.S. PATENT DOCUMENTS

| 5,359,638 | 10/1994 | Hsieh et al. | 378/901 X |
|---|---|---|---|
| 5,473,655 | 12/1995 | Hu | 378/901 X |
| 5,561,695 | 10/1996 | Hu | 378/901 X |

*Primary Examiner*—David P. Porta
*Attorney, Agent, or Firm*—John S. Beulick; John H. Pilarski

[57] ABSTRACT

The present invention, in one embodiment, is a system for performing image reconstruction from unfiltered scan data acquired in a tomographic scan. More specifically, the system implements an algorithm for unfiltered scan data which eliminates the requirement that the scan data for a particular view be fully filtered for image reconstruction. Particularly, unfiltered scan data for a base view is fully filtered to generate filtered scan data for the base view. At least a portion of the filtered scan data for the base view is then used for subsequent views. Particularly, for a subsequent view, only the high frequency components of unfiltered scan data for that view are filtered with a short filter. The filtered high frequency components then are added to the low frequency components of the filtered base view scan data to estimate fully filtered scan data for the subsequent view.

20 Claims, 4 Drawing Sheets

| view number | pM | 1. in [pM,(p+1)M] | (p+1)M |
|---|---|---|---|
| view | $V_{pM}$ | $V_i$ | $V_{(p+1)M}$ |
| Low frequency estimate | | $f(V_{pM}, V_{(p+1)M})$ | |
| High frequency estimate | | $V_i - f(V_{pM}, V_{(p+1)M})$ | |
| FFT | 2K FFT | 1K FFT | 2K FFT |
| frequency domain multiply | 2K | 1K | 2K |
| Inverse FFT | 2K IFFT | 1K IFFT | 2K IFFT |
| Filtered view | $F_{2K}(V_{pM})$ | $F_{1K}(V_i - f(V_{pM}, V_{(p+1)M})) + f(F_{2K}(V_{pM}), F_{2K}(V_{(p+1)M}))$ | $F_{2K}(V_{(p+1)M})$ |

METHODS AND APPARATUS FOR SIMPLIFIED FILTERING OF SCAN DATA IN AN IMAGING SYSTEM

FIELD OF THE INVENTION

This invention relates generally to data filtering and more particularly, to filtering scan data in an imaging system.

BACKGROUND OF THE INVENTION

In an imaging system such as a computed tomography (CT) system, an x-ray source projects a fan-shaped beam which is collimated to lie within an X–Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles during one revolution of the x-ray source and detector. In an axial scan, the projection data is processed to construct an image that corresponds to a two dimensional slice taken through the object.

One method for reconstructing an image from a set of projection data is referred to in the art as the filtered back projection technique. This process converts the attenuation measurements from a scan into integers called "CT numbers" or "Hounsfield units", which are used to control the brightness of a corresponding pixel on a cathode ray tube display.

To reduce the total scan time required for multiple slices, a "helical" scan may be performed. To perform a "helical" scan, the patient is moved while the data for the prescribed number of slices are acquired. Such a system generates a single helix from a one fan beam helical scan. The helix mapped out by the fan beam yields projection data from which images in each prescribed slice may be reconstructed. In addition to reduced scanning time, helical scanning provides other advantages such as improved image quality and better control of contrast.

In helical scanning, and as explained above, only one view of data is collected at each slice location. To reconstruct an image of a slice, the other view data for the slice are generated based on the data collected for other views. Helical reconstruction algorithms are known, and described, for example, in C. Crawford and K. King, "Computed Tomography Scanning with Simultaneous Patient Translation," Med. Phys. 17(6), Nov/Dec 1990.

In known imaging systems, the data for each view typically is fully filtered before reconstructing an image for such view. Requiring that all data for each view be fully filtered increases the time required to reconstruct an image. Until now, however, it was believed that reducing or eliminating any filtering would significantly degrade image quality.

It would be desirable to decrease image reconstruction time in an imaging system. It also would be desirable to decrease reconstruction time without significantly degrading overall image quality, and without requiring significant cost increases in known imaging systems. It further would be desirable to increase data filtration speed and reduce filtration costs when reconstructing images.

SUMMARY OF THE INVENTION

These and other objects may be attained with a system which, in one embodiment, implements an algorithm for scan data which eliminates the requirement that the scan data for a particular view be fully filtered for image reconstruction. Particularly, and in accordance with one embodiment of the present invention, unfiltered scan data for a base view is fully filtered to generate filtered scan data for the view. At least a portion of the filtered scan data for the base view is then used for subsequent views. More specifically, for a subsequent view, only the high frequency components of that view are filtered with a short filter. The filtered high frequency components then are added to the filtered base view scan data to estimate fully filtered data for the subsequent view.

Using the algorithm described above decreases the processing time required for filtering data for views subsequent to the base view. Such algorithm also is not believed to significantly decrease image quality. In addition, such algorithm increases the speed of data filtration which also reduces the computational costs associated with data filtration.

DETAILED DESCRIPTION OF THE DRAWINGS

Figure 1:
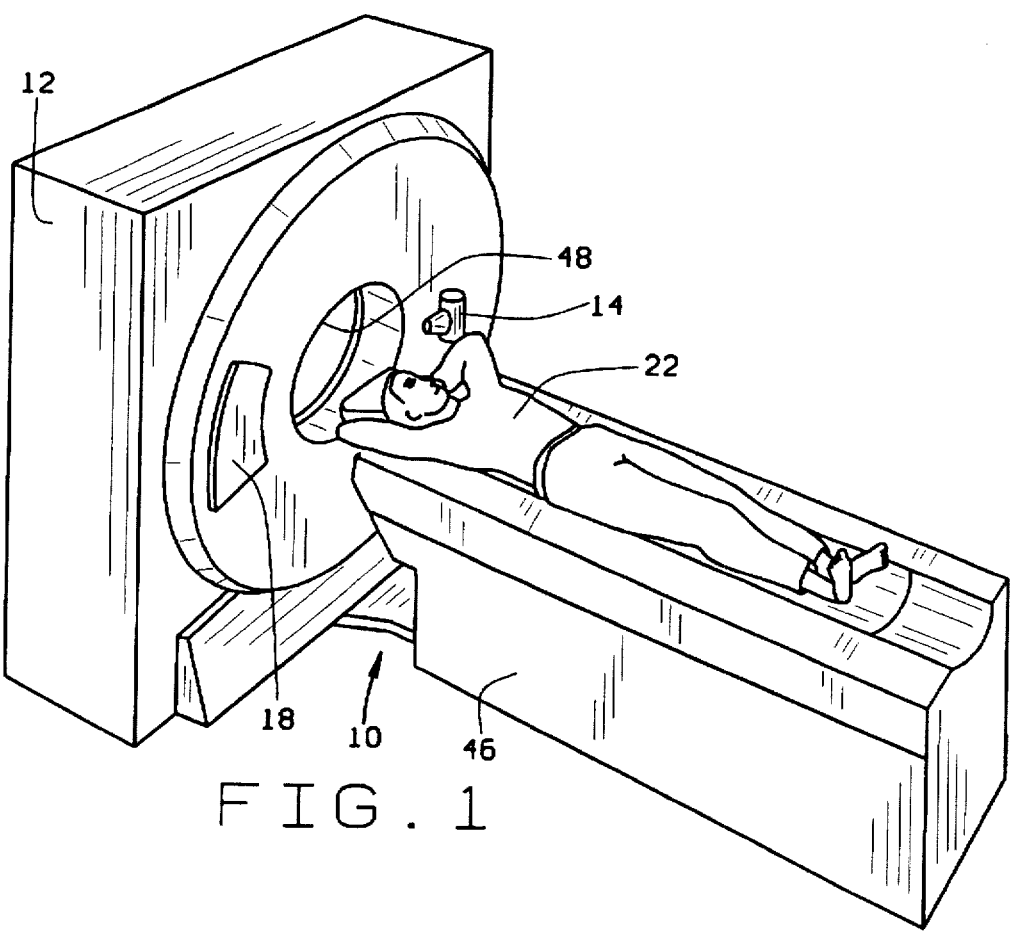
FIG. 1 is a pictorial view of a CT imaging system.
Figure 2:
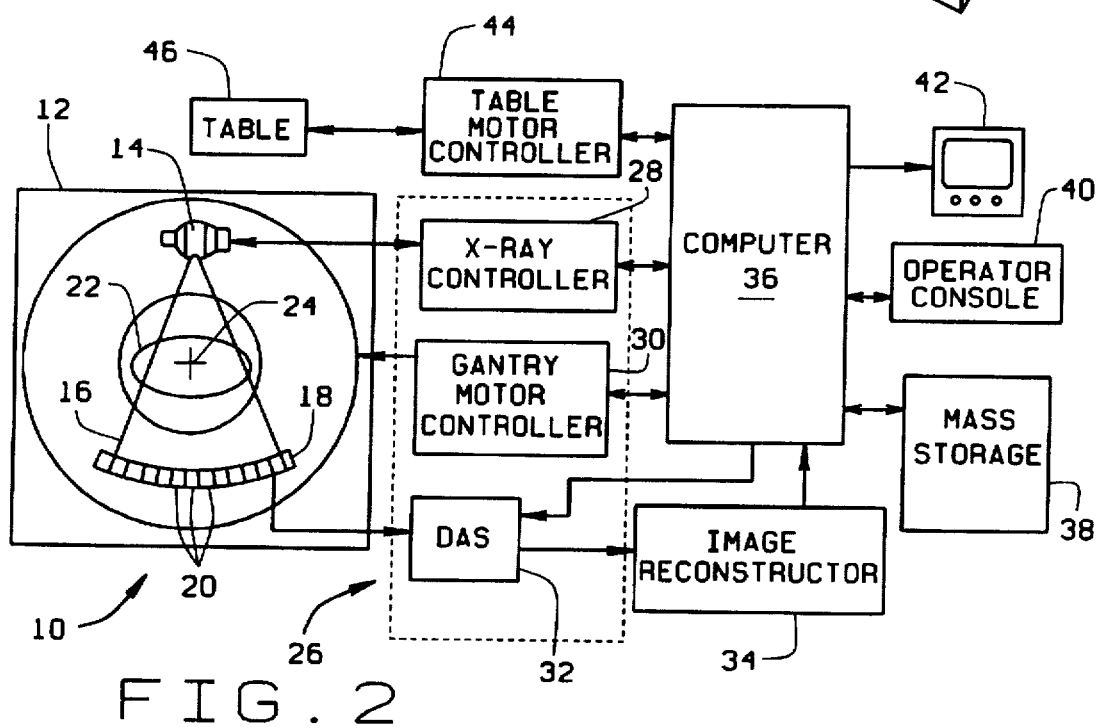
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. X-ray beam is collimated by a collimate (not shown) to lie within in an X–Y plane of a Cartesian coordinate system and generally referred to as an "imaging plane". Detector array 18 is formed by detector elements 20 which together sense the projected x-rays that pass through a medical patient 22. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

The following discussion sometimes refers specifically to CT systems using an axial scan. The present algorithm, however, is not limited to practice in connection with such systems, and may be used with other CT systems, such as helical scan CT systems, dynamic CT systems and CT Fluoro systems. Further, in one embodiment, the algorithm would be implemented in computer 36 and would process, for example, data stored in mass storage 38. Alternatively, the algorithm could be implemented in image reconstructor 34 and supply filtered image data to computer 36. Other alternative implementations are, of course, possible.

Figures 3, 6:
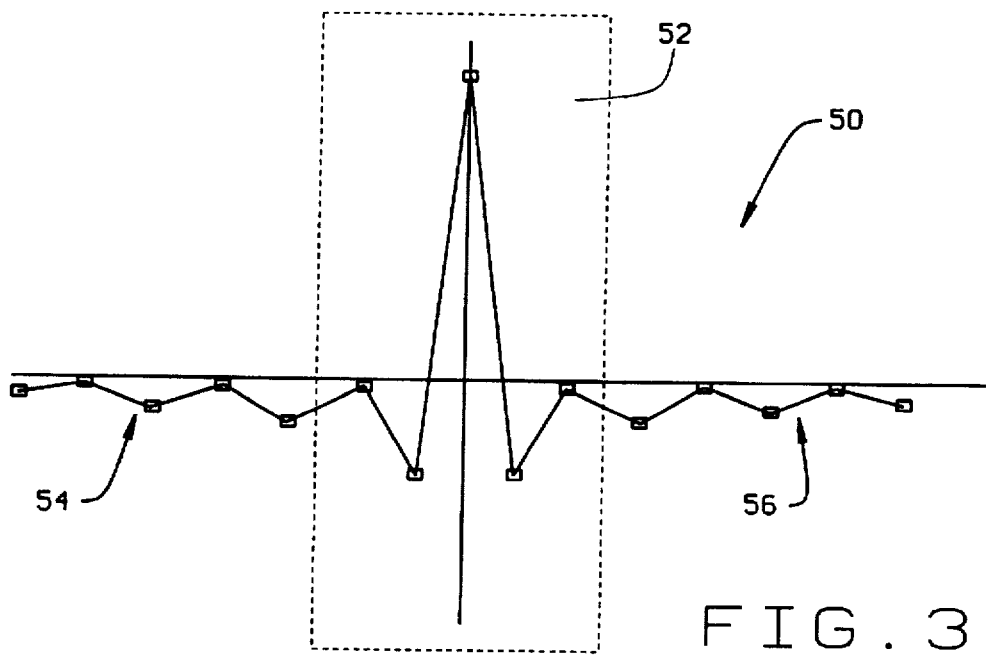
FIG. 3 illustrates an impulse response of a known filter, or reconstruction kernel, used to filter scan data.
FIG. 6 illustrates a filtering computational time line for fully filtering scan data in accordance with the algorithm illustrated in FIG. 5.

FIG. 3 illustrates an impulse response 50 of a known filter, or reconstruction kernel, utilized for filtering scan data. As shown, impulse response 50 includes a central portion 52 with two tails 54 and 56. Central portion 52 substantially defines high frequency components of the filtered scan data, while tails 54 and 56 essentially define low frequency components of the filtered scan data. If filtering is to be performed on 852 data points, i.e., N=852, and the filter kernel is initially configured to perform computations on 2*1024 points, the reconstruction kernel is truncated to twice the difference between 1024 and 852. Low frequency components, i.e., tails 54 and 56, of filtered data typically do not vary rapidly from view-to-view.

Generally, and in accordance with one embodiment of the present algorithm, a full image quality scan is performed to acquire unfiltered scan data of patient 22 or an object of interest. Unfiltered scan data for a base view, $v_B$, of the object of interest is fully filtered in accordance with known filtering techniques to generate fully filtered scan data, $f_{full}(v_B)$, for such base view. For each subsequent view, only the high frequency components are fully filtered. The fully filtered high frequency data for a subsequent view is added to the fully filtered base view scan data to estimate the fully filtered data for the subsequent view.

Figure 4:
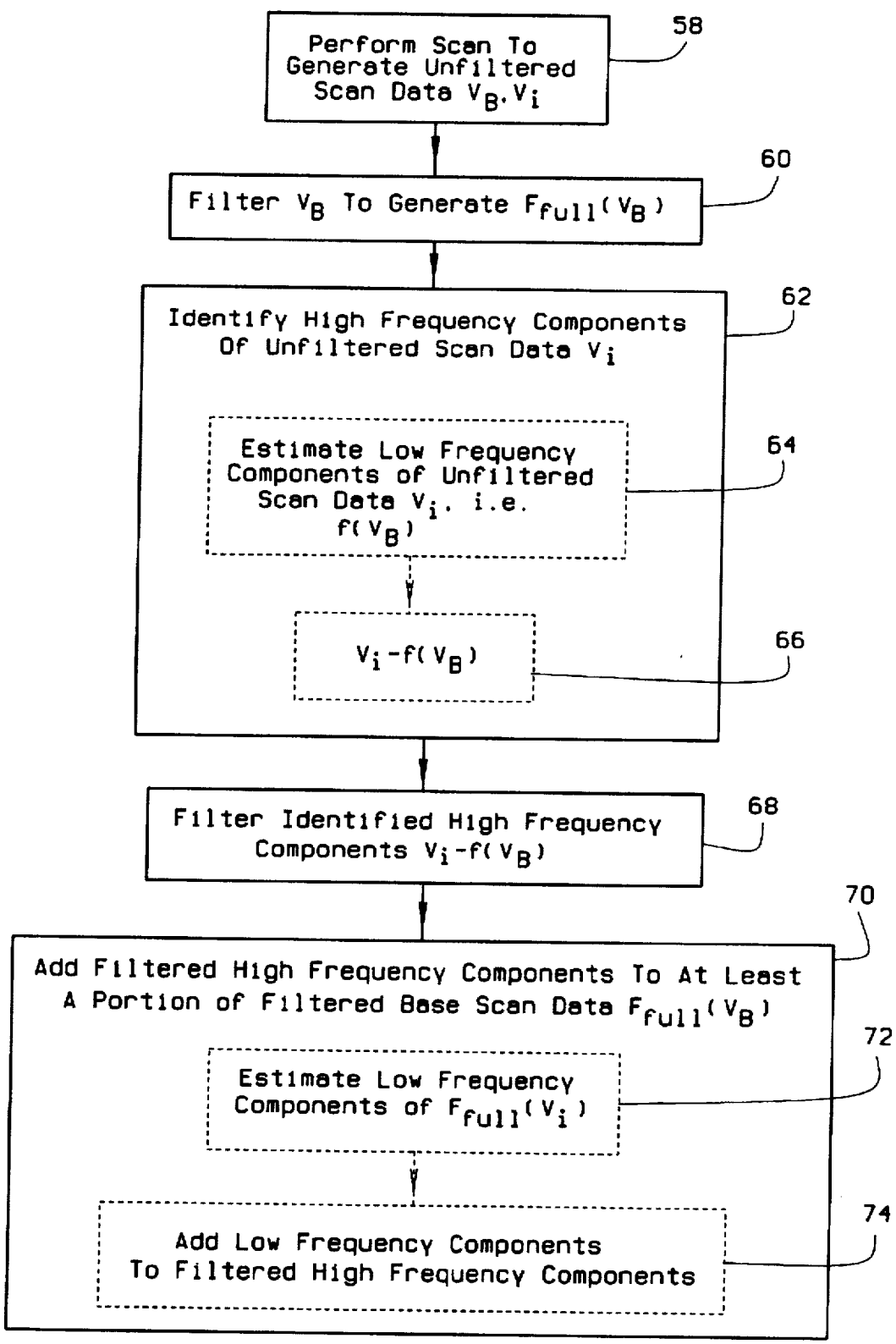
FIG. 4 illustrates a sequence of process steps in accordance with one embodiment of the present invention for generating fully filtered scan data for a base view and a subsequent view.

More particularly, FIG. 4 illustrates a sequence of process steps in accordance with one embodiment of the present invention for generating fully filtered scan data for a base view and a subsequent view. As explained above, a scan is performed 58 to acquire unfiltered scan data for a plurality of views. The scan acquires, for example, unfiltered scan data $v_B$ for a base view and unfiltered scan data $v_i$ for a subsequent view i. Unfiltered base view scan data $v_B$ is filtered 60 to generate filtered scan data $F_{full}(v_B)$ for the base view.

High frequency components of unfiltered subsequent view scan data $v_i$ are then identified 62 using at least a portion of unfiltered base view scan data $v_B$. Particularly, at least a portion of unfiltered base view scan data $v_B$ are used to estimate 64 low frequency components $v_i^L$ of unfiltered subsequent view scan data $v_i$ in accordance with a function $f(v_B)$, and that estimate may include some of the higher frequency components of subsequent view scan data $v_i$. In accordance with one embodiment, and since low frequency components do not vary rapidly between views, the low frequency components of unfiltered subsequent view scan data $v_i$ are estimated to be the same as unfiltered base view scan data $v_B$, i.e., $v_i^L = f(v_B = v_B)$. The estimated low frequency components of unfiltered subsequent view scan data $v_i$, i.e., $f(v_B)$ are then subtracted 66 from unfiltered subsequent view scan data $v_i$, i.e., $v_i - f(v_B)$, to identify the high frequency components (or possibly a subset thereof) of unfiltered subsequent view scan data $v_i$. Particularly, high frequency components $v_i^H$ of unfiltered subsequent view scan data $v_i$ are determined in accordance with the relationship $v_i^H = v_i - f(v_B) = v_i - v_i^L$.

The high frequency components $v_i - f(v_B)$ are then filtered 68 to generate filtered high frequency data components $F_{HF}(v_i - f(v_B))$. The high frequency components $v_i - f(v_B)$ may be filtered with a short, i.e., small, filter kernel to further reduce processing time. The short kernel, in one embodiment, requires only approximately one-half of the operations required when fully filtering unfiltered scan data $v_B$.

Filtered high frequency components $F_{HF}(v_i - f(v_B))$ are then added 70 to at least a portion of filtered base view scan data $F_{full}(v_B)$ to estimate fully filtered scan data $F_{full}(v_i)$ for the subsequent view. Particularly, the filtered base view scan data $F_{full}(v_B)$ are used to estimate 72 low frequency components of filtered subsequent view scan data $F_{full}(v_i)$ in accordance with a function $f(F_{full}(v_B))$ which is substantially the same as function $f(v_B)$. Since low frequency components do not vary rapidly between views, as described above, the low frequency components of filtered subsequent view scan data $f(F_{full}(v_B))$ may be estimated to be the same as filtered base view scan data $F_{full}(v_B)$, i.e., $f(F_{full}(v_B)) = F_{full}(v_B)$. The estimated low frequency components of filtered subsequent view $f(F_{full}(v_B))$ are then added 74 to filtered high frequency data components $F_{HF}(v_i - f(v_B))$, i.e., $f(F_{full}(v_B)) + F_{HF}(v_i - f(v_B))$, to estimate fully filtered scan data $F_{full}(v_i)$ for the subsequent view.

With the above-described embodiment, only the base view scan data is fully filtered with a full filter. Fully filtered scan data for subsequent views is obtained with a high frequency filter which is shorter, and less computationally complex, than the full filter. Specifically, the computational costs and complexity for fully filtering scan data $v_i$ can be described as:

$$f_{full}(v_i) = F_{HF}(v_i - f(v_B)) + f(F_{full}(v_B)) \quad (1)$$

where:

$F_{full}(v_i)$ is the fully filtered scan data for view i;

$f(v_B)$ is the estimated unfiltered low frequency scan data for view i;

$f(F_{full}(v_B))$ is the estimated filtered low frequency scan data for view i; and $F_{HF}(v_i-f(v_B))$ is the filtered high frequency scan data for view i.

As one specific example, computational costs and time savings are determined in accordance with estimating fully filtered data in a frequency domain. When filtering data in the frequency domain, fast fourier transforms (FFTs) typically are applied to raw data. Particularly, a forward FFT is applied to the raw data, and such data are subject to a complex multiplication function. Subsequently, an inverse FFT is applied to the data to generate filtered data.

When $f(v_B)=v_B$ and $f(F_{full}(v_B)=F_{full}(v_B)$, and when FFTs are used to fully filter unfiltered scan data, full filter vectors of length 2*N2n, where N2n is the first power of 2 larger or equal to N, typically are required. For example, for 850 points in a projection, i.e., N=850, vectors of a length 2048, i.e., 2*1024, typically are required. Accordingly, fully filtering each view in accordance with known methods requires in the order of $2*N2n*\log_2(2*N2n)$ computations for (1) the forward FFT, (2) the inverse FFT, and in the order of 2*N2n computations for (3) the complex multiplication function.

However, the above-described method enables unfiltered scan data for any subsequent view $v_i$ to be fully filtered with vectors having a length of only N2n (e.g., having a length of 1024 in the above example). Filtering the high frequency data requires only approximately one-half of the computations required for filtering base view scan data $v_B$. Particularly, only approximately $(N2n)*(\log_2(N2n))+(2*N)$ computations are necessary when applying a forward FFT and an inverse FFT to the estimated high frequency data $v_i^H$. The computation ratio for applying forward FFTs and inverse FFTs to data for each view $v_i$ filtered with the above-described method to the known method approximates:

$$\text{Computation ratio} = \frac{N2n * \log_2(N2n) + 2 * N}{2 * N2n * \log_2(2 * N2n)}$$

With respect to performing complex multiplication, the above-described method requires only one-half as many computations as the known method.

Accordingly, the above-described algorithm reduces the processing time required for filtering scan data for a plurality of views. Particularly, the algorithm provides filtered scan data for each subsequent view $v_i$ with approximately one-half of the computations as required for filtering scan data for the base view. Therefore, image reconstruction time is reduced, and filtering time and complexity are reduced.

The above-described algorithm may be modified to filter data in domains other than the frequency domain (e.g., the space domain), and computational savings may be larger in such other domains. Similarly, such embodiment may be used in connection with imaging systems other than CT systems. In addition, the above-described algorithm may be modified to estimate fully filtered scan data using more than one fully filtered base view. For example, the base view $v_B$, may periodically be refreshed. Particularly, new base views may be periodically selected throughout a scan and such new base views may then be used to estimate fully filtered data for subsequent views.

Figure 5:
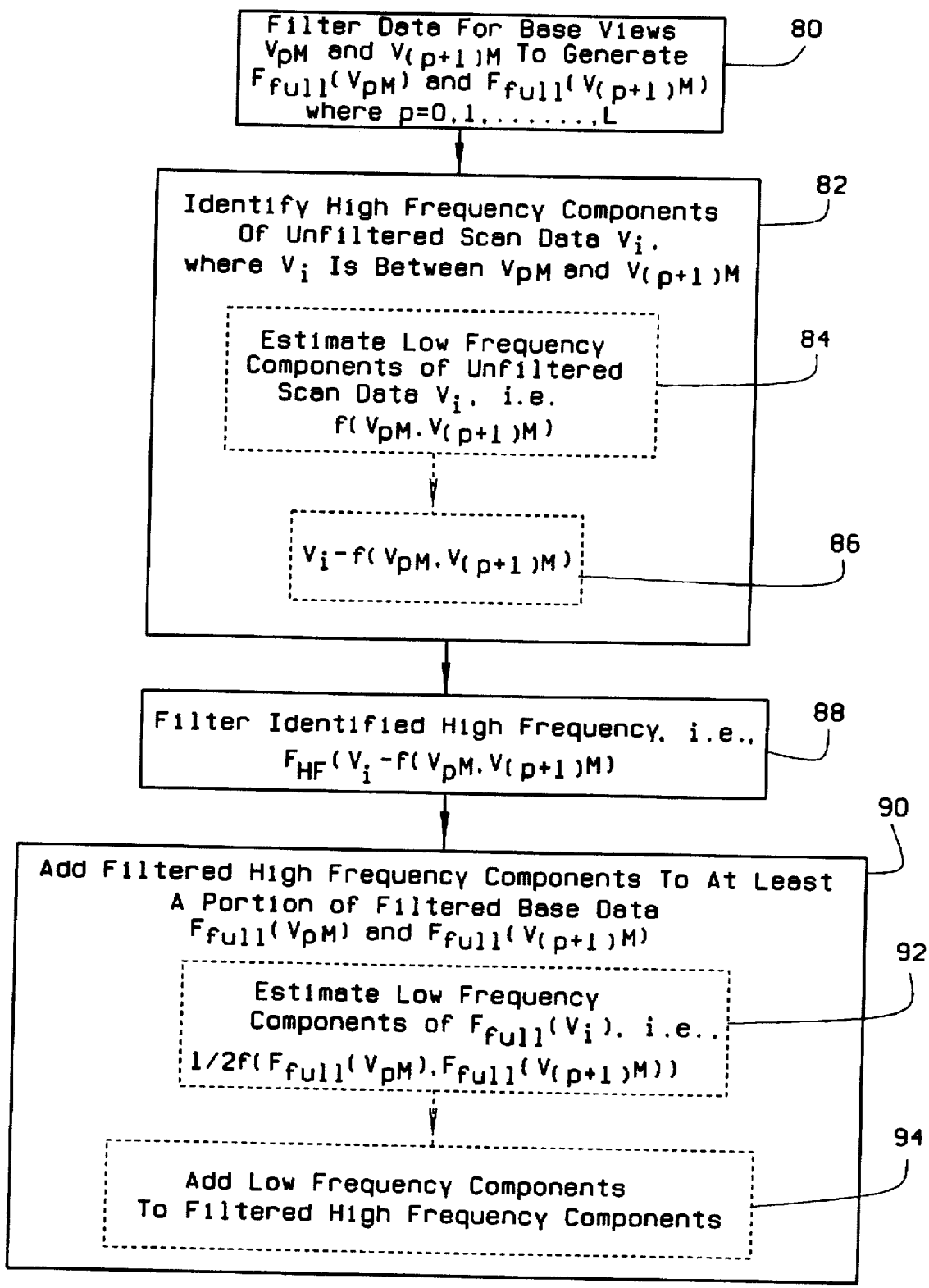
FIG. 5 illustrates a sequence of process steps in accordance with another embodiment of the present invention for generating fully filtered scan data for base views and a subsequent view.

Alternatively, a plurality of base views may simultaneously be used to estimate fully filtered data for views intermediate such base views. FIG. 5, for example, illustrates a sequence of process steps in accordance with another embodiment of the present invention. Assume that raw scan data for one in every M views is fully filtered in accordance with known full filtering methods. Assume also that p is a measuring index having a value of 0, 1, ..., L, where L is a maximum number of views acquired during a scan divided by M. Unfiltered scan data for two base views $v_{pM}$ and $v_{(p+1)M}$ are fully filtered 80 to generate filtered scan data $F_{full}(v_{pM})$ and $F_{full}(v_{(p+1)M})$ for the respective views. Number of views to be fully filtered M may be selected prior to a scan and stored, for example, in mass storage 38.

High frequency components of unfiltered intermediate view scan data $v_i$ are then identified 82 using at least a portion of unfiltered base view scan data $v_{pM}$ and $(v_{(p+1)M})$. Particularly, unfiltered base view scan data $v_{pM}$ and $v_{(p+1)M}$ are used to estimate 84 low frequency components $v_i^L$ of unfiltered intermediate view scan data $v_i$ in accordance with a function $f(v_{pM}, v_{(p+1)M})$. In accordance with one embodiment, the low frequency components of unfiltered intermediate view scan data $v_i$ are estimated to be an average of the unfiltered base view scan data $v_{pM}$ and $v_{(p+1)M}$, i.e., $v_i^L=f(v_{pM}, v_{(p+1)M})=(½)*(v_{pM}+v_{(p+1)M})$. Estimated low frequency components of unfiltered intermediate view scan data $v_i$ are then subtracted 86 from unfiltered intermediate view scan data $v_i$, i.e., $v_i-f(v_{pM}, v_{(p+1)M})$, to identify the high frequency components of unfiltered intermediate view scan data $v_i$. Unfiltered high frequency data $v_i-f(v_{pM}, v_{(p+1)M})$ is then filtered 88 with a short, or high frequency, filter to generate filtered high frequency data $F_{HF}(v_i-f(v_{pM}, v_{(p+1)M}))$.

Filtered high frequency data $F_{HF}(v_i-f(v_{pM}, v_{(p+1)M}))$ is then added 90 to at least a portion of filtered base view scan data $F_{full}(v_{pM})$ and $F_{full}(v_{(p+1)M})$ to estimate fully filtered scan data $F_{full}(v_i)$ for the intermediate view. More specifically, filtered base view scan data $F_{full}(v_{pM})$ and $F_{full}(v_{(p+1)M})$ is used to estimate 92 low frequency components of filtered intermediate view scan data $F_{full}(v_i)$ in accordance with a function $f(F_{full}(v_{pM}), F_{full}(v_{(p+1)M}))$ which is substantially the scan as function $f(v_{pM}, v_{(p+1)M})$. For example, the low frequency components of filtered intermediate view scan data $f(F_{full}(v_{pM}), F_{full}(v_{(p+1)M}))$ may be estimated to be the average of filtered base view scan data $F_{full}(v_{pM})$ and $F_{full}(v_{(p+1)M})$, i.e., $f(F_{full}(v_{pM}), F_{full}(v_{(p+1)M}))=(½)*(F_{full}(v_{pM})+F_{full}(v_{(p+1)M}))$. Estimated low frequency components of filtered intermediate view $f(F_{full}(v_{pM}), F_{full}(v_{(p+1)M}))$ are then added 94 to filtered high frequency data components $F_{HF}(v_i-f(v_{pM}, v_{(p+1)M}))$, i.e., $f(F_{full}(v_{pM}), F_{full}(v_{(p+1)M}))+F_{HF}(v_i-f(v_{pM}, v_{(p+1)M}))$ to estimate fully filtered scan data $F_{full}(v_i)$ for the intermediate view.

FIG. 6 illustrates a filtering computational time line for filtering scan data in the frequency domain in accordance with the above-described algorithm. Specifically, a 2K Fast Fourier Transform (FFT), which applies to 2048 points, is used to fully filter scan data $v_{pM}$ and $v_{(p+1)M}$. For intermediate views, however, only the high frequency scan data $v_i-f(v_{pM}, v_{(p+1)M})$ is filtered, which requires only a 1K FFT, i.e., a FFT configured to perform computations on 1024 points. Fully filtered scan data for each intermediate view $v_i$ between base views $v_{pM}$ and $v_{(p+1)M}$ may be obtained with only approximately one-half of the computations as required for fully filtering scan data for base views $v_{pM}$ and $v_{(p+1)M}$. Specifically applying a 1K forward FFT and a 1K inverse FFT to high frequency data $v_i-f(v_{pM}, v_{(p+1)M})$ each require only slightly more than ½ of the computations needed to apply a 2K forward FFT and a 2K inverse FFT, respectively, to unfiltered base view data $v_{pM}$ and $v_{(p+1)M}$. Performing complex multiplications on the high frequency data $v_i-f(v_{pM}, v_{(p+1)M})$ requires on ½ as many computations.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, although the imaging system described herein is a "third generation" CT system, many other imaging systems, such as multislice, volumetric and "fourth generation" CT systems may be used. Similarly, imaging systems such as magnetic resonance (MR) systems may be used. In addition, the algorithm described may be implemented in connection with an axial scan. Furthermore, the scan data described herein may be either projection data or image data. Moreover, such estimation may be performed in connection with one dimensional, two dimensional, or three or more dimensional data filtering. Accordingly, the spirit and scope of the invention are to be limited only by the terms of the appended claims.

What is claimed is:

1. A method for reconstructing an image of an object in an imaging system using unfiltered scan data acquired in a scan, said detector array comprising a plurality of detectors, said method comprising the steps of:

fully filtering the unfiltered scan data for at least one base view to generate filtered scan data for the base view; and estimating fully filtered scan data for a subsequent view utilizing at least a portion of the fully filtered base view scan data.

2. A method in accordance with claim 1 wherein estimating the fully filtered scan data for the subsequent view comprises the step of:

identifying unfiltered high frequency components of the scan data for the subsequent view using at least a portion of the unfiltered scan data for the base view.

3. A method in accordance with claim 2 wherein identifying the unfiltered high frequency components of scan data for the subsequent view comprises the steps of:

estimating unfiltered low frequency components of the scan data for the subsequent view using at least a portion of the unfiltered scan data for the base view; and subtracting the estimated unfiltered low frequency components of the scan data for the subsequent view from the scan data for the subsequent view.

4. A method in accordance with claim 3 wherein the estimated unfiltered low frequency components of the scan data for the subsequent view comprise the unfiltered scan data for the base view.

5. A method in accordance with claim 2 further comprising the step of filtering the identified unfiltered high frequency components of the scan data for the subsequent view.

6. A method in accordance with claim 5 further comprising the step of adding the filtered high frequency components of the scan data for the subsequent view to at least a portion of the filtered scan data for the base view.

7. A method in accordance with claim 6 comprising the step of adding the filtered high frequency components of the scan data for the subsequent view to the filtered scan data for the base view.

8. A method in accordance with claim 1 comprising the steps of:

fully filtering the unfiltered scan data for first and second base views; and estimating fully filtered scan data for an intermediate view between said first and second base views utilizing at least a portion of the filtered scan data of at least one of the first and second base views.

9. A method in accordance with claim 1 wherein the imaging system is a computed tomography system.

10. A method in accordance with claim 1 wherein the imaging system is a magnetic resonance system.

11. A method in accordance with claim 1 wherein the imaging system is a multidimensional volumetric system.

12. A system for reconstructing an image of an object using unfiltered scan data acquired in an image scan, said system configured to:

fully filter the unfiltered scan data for at least one base view to generate filtered scan data for the base view; and estimate fully filtered scan data for a subsequent view utilizing at least a portion of the fully filtered base view scan data.

13. A system in accordance with claim 12 wherein to identify the fully filtered scan data for the subsequent view, said system is configured to:

identify unfiltered high frequency components of the scan data for the subsequent view using at least a portion of the unfiltered scan data for the base view.

14. A system in accordance with claim 13 wherein to estimate the unfiltered high frequency components of scan data for the subsequent view, said system is configured to:

estimate unfiltered low frequency components of the scan data for the subsequent view using at least a portion of the unfiltered scan data for the base view; and subtract the estimated unfiltered low frequency components of the scan data for the subsequent view from the scan data for the subsequent view.

15. A system in accordance with claim 14 wherein the estimated unfiltered low frequency components of the scan data for the subsequent view comprise the unfiltered scan data for the base view.

16. A system in accordance with claim 13 further configured to filter the identified unfiltered high frequency components of the scan data for the subsequent view.

17. A system in accordance with claim 16 further configured to add the filtered high frequency components of the scan data for the subsequent view to at least a portion of the filtered scan data for the base view.

18. A system in accordance with claim 17 configured to add the filtered high frequency components of the scan data for the subsequent view to the filtered scan data for the base view.

19. A system in accordance with claim 12 configured to:

fully filter the unfiltered scan data for first and second base views ; and estimate fully filtered scan data for an intermediate view between said first and second base views utilizing at least a portion of the filtered scan data of at least one of the first and second base views.

20. A system in accordance with claim 12 further configured to perform a computed tomography scan.

* * * * *